United States Patent [19]
Gomes

[11] Patent Number: 5,170,306
[45] Date of Patent: Dec. 8, 1992

[54] METHOD AND APPARATUS FOR GAGING THE GEOMETRY OF POINT THREADS AND OTHER SPECIAL THREADS

[75] Inventor: Kenneth Gomes, Mattapoisett, Mass.

[73] Assignee: Research Engineering & Manufacturing, Inc., Middletown, R.I.

[21] Appl. No.: 572,484

[22] Filed: Aug. 23, 1990

Related U.S. Application Data

[63] Continuation-in-part of Ser. No. 494,612, Mar. 16, 1990, abandoned.

[51] Int. Cl.$^5$ .............................................. G01B 7/28
[52] U.S. Cl. ................................. 364/560; 33/199 R; 33/546; 364/554
[58] Field of Search ........... 364/560, 563, 554, 474.37; 33/543, 545, 546, 550, 784, 199 R

[56] References Cited

U.S. PATENT DOCUMENTS

| | | | |
|---|---|---|---|
| 3,879,854 | 4/1975 | Johnson | 33/199 R |
| 4,064,633 | 12/1977 | Wertepny | 33/550 X |
| 4,490,800 | 12/1984 | Powers | 364/563 X |
| 4,625,429 | 12/1986 | Danielli | 33/550 X |
| 4,651,438 | 3/1987 | Hutter et al. | 33/550 |
| 4,662,074 | 5/1987 | Knapp et al. | 33/546 X |
| 4,736,313 | 4/1988 | Nishimura et al. | 364/563 |
| 4,787,814 | 11/1988 | Vaerman | 33/550 |
| 4,930,096 | 5/1990 | Shimizu et al. | 33/784 |
| 4,964,071 | 10/1990 | Grosvenor | 364/560 |
| 5,060,173 | 10/1991 | Tsuji | 364/560 |

Primary Examiner—Kevin J. Teska
Assistant Examiner—Michael Zanelli
Attorney, Agent, or Firm—Trexler, Bushnell, Giangiorgi & Blackstone, Ltd.

[57] ABSTRACT

A method for gaging the geometry of selected sections of threaded fasteners comprises providing a gage for measuring a plurality of cross-sectional dimensions of the selected sections, positioning a fastener with the selected sections in surface-to-surface contact with the gage, recording information corresponding to the dimensions of the selected sections as measured by the gage to form recorded data, and ascertaining information representative of the geometry of the selected section from the recorded data.

11 Claims, 3 Drawing Sheets

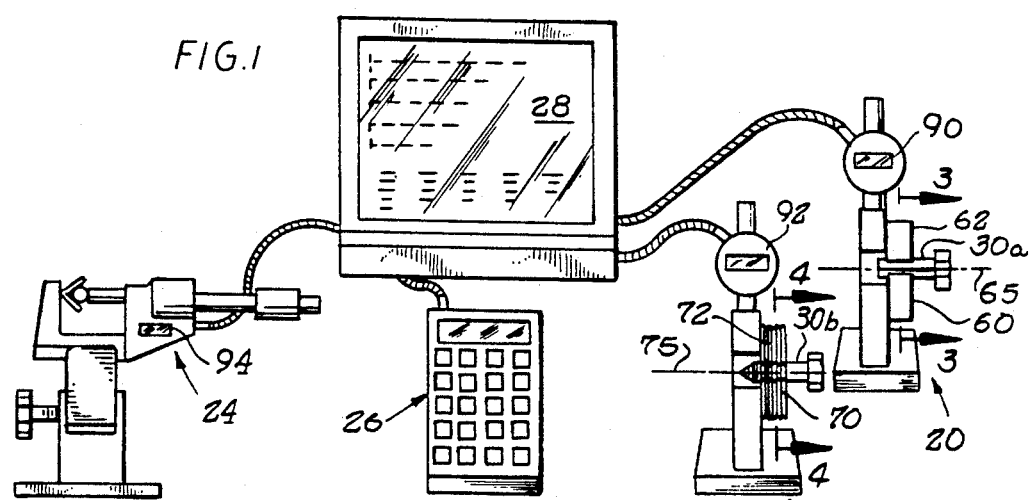
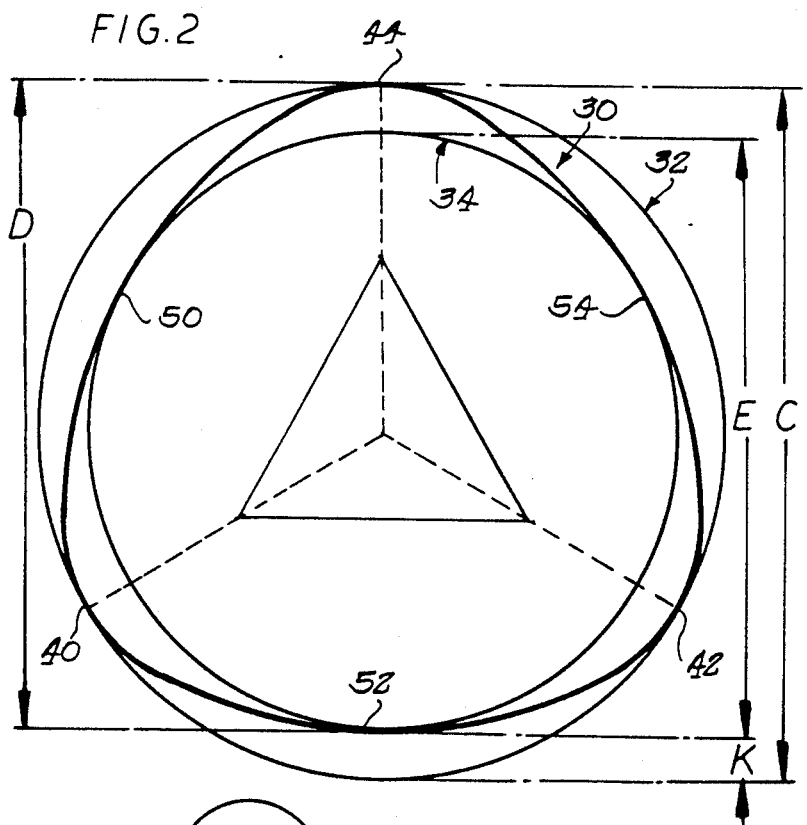
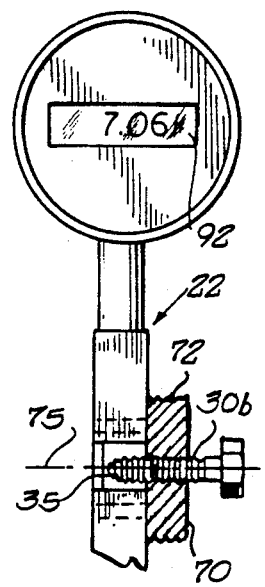
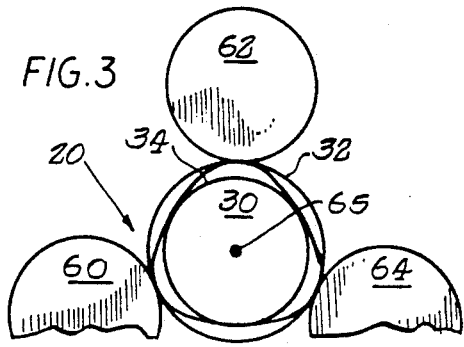
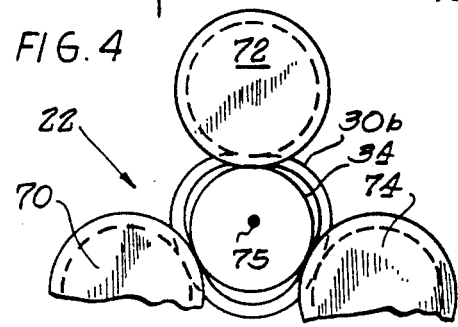

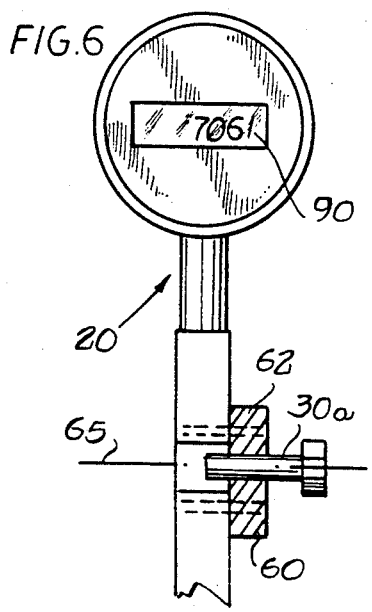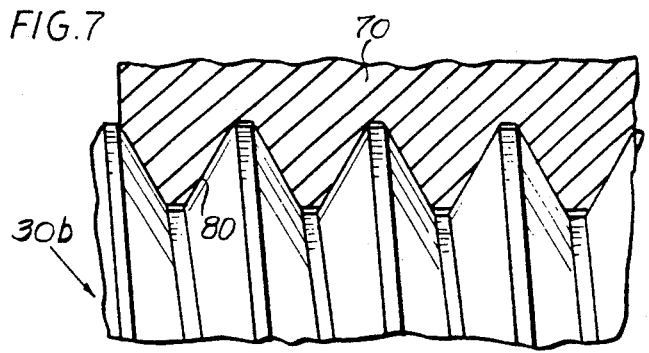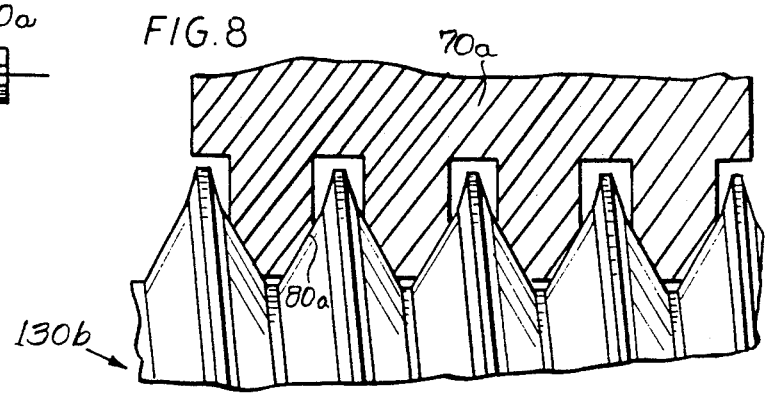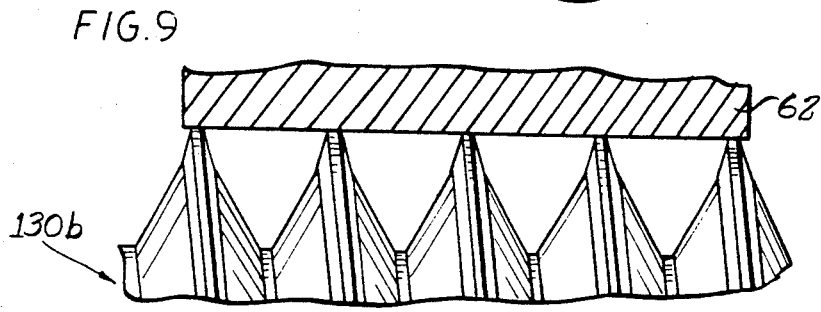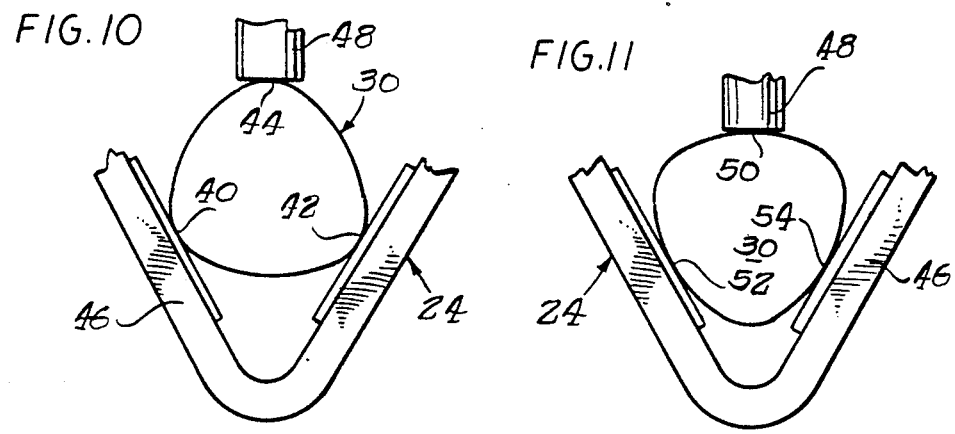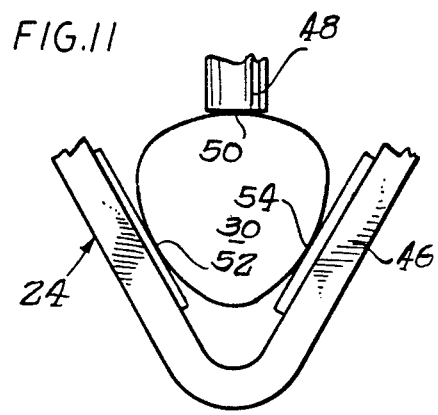

METHOD AND APPARATUS FOR GAGING THE GEOMETRY OF POINT THREADS AND OTHER SPECIAL THREADS

CROSS-REFERENCE TO RELATED APPLICATION

This application is a continuation-in-part of my earlier application Ser. No. 494,612 filed Mar. 16, 1990, now abandoned.

BACKGROUND OF THE INVENTION

This invention is directed to the threaded fastener arts and more particularly to a novel and improved method and apparatus for gaging threaded fasteners and still more particularly for gaging point threads of threaded fasteners, or other special threads.

Such gaging is preferably carried out in order to determine deviations of the dimensions of such fasteners from the specified or desired dimensions, which data may be utilized for statistical in-process control, for lot control and the like. While the method and apparatus of the invention may be utilized for measuring or gaging of other types of special threads, the ensuing discussion will be directed primarily to the gaging of point threads of poly-arcuate or lobular fasteners.

Such point threads may comprise thread-forming or thread cutting threads for forming a thread in a pilot hole during driving of the fastener, or an anticross-threading tapered lead-in portion of the fastener, for engaging a pretapped workpiece. Other forms of special threads which may be gaged in accordance with the invention include the threads in a work-entering section of a dual lobulated type of fastener such as shown for example in U.S. Pat. No. 4,040,328, or an intermediate, initial thread-forming section of a step-taper fastener of the type shown in U.S. Pat. No. 4,194,430.

The gaging of lobular fasteners has traditionally been a somewhat complicated task, because the degree of lobulation or out-of-roundness is just as important as the basic thread dimensions in the formation of these fasteners. The degree of lobulation, or out of round, is usually defined as half the diametral difference between the inscribed and circumscribed circles of a cross-section arcuate form of the fastener. Such lobular fasteners are used extensively both as thread-forming screws and for self-locking, or sealing purposes in pre-tapped holes.

In either of these general applications control of the degree of lobulation is important in assuring proper performance of the product. For example, this degree of lobulation (commonly designated K) must exceed a certain minimum for thread-forming with a reasonable driving effort or for entry into a preformed thread and adequate sealing or self-locking with acceptable driving effort. On the other hand, if this K or degree of lobulation exceeds a certain maximum amount, the tensile load-carrying ability of the joint in the work may be seriously comprised, due to the reduced surface contact area of the threads In the case of lobular thread rolling or thread-forming screws, it is estimated that as much as 95% or more of the work or effort in forming internal threads is performed by the lead or point threads. The lead threads may be considered to be enveloped or circumscribed within a lobular, frustoconical shape with lobes corresponding in number with those of the body threads. The angle of this cone and number of lead threads is governed by the individual product specifications from one fastener to another. However, it will be appreciated that the cross-sectional dimensions will vary from thread to thread, along this tapered lead-in portion.

The driving effort in the installation of such a thread-rolling or thread-forming screw is generally indicated by the applied torque measured over the degrees of rotation (expressed in radians) of the screw. As the screw is driven, the rotation is accompanied by a progressive radial outward movement of the lead threads with increasing torque in forming complementary internal mating threads in the workpiece or nut. Consequently, the method and apparatus of the invention is used in evaluating the relationship of the K or out-of-round dimension to the rotation of the lead threads of such a thread-forming fastener, to assure the same are formed in such a manner as to obtain the desired driving effort and thread forming action.

In the past, conventional screw body threads have often been measured by threading each fastener to be tested into each of a pair of so-called ring or functional gages, which have internal threads corresponding with maximum and minimum allowable external thread dimensions of the fastener. An acceptable product was considered to be one which could be threaded into the maximum gage but not into the minimum gage. However, it should be recognized that non-entry into the minimum gage could be the result of only a single oversize thread element or portion, and would not imply any control whatever on the individual minimum thread dimensions of the fastener. In recent years this condition has been alleviated somewhat through the use of pitch diameter micrometers, individual element indicator gages and other techniques. However, these methods have not been successfully applied to the measurement of point threads.

Past methods of gaging the cross-sectional dimensions of body threads of lobular thread-forming and self-locking screws used hand micrometers. In a first measurement, a multi-anvil type micrometer was used, in which the fastener was rotated to obtain the maximum reading; that is, the diameter of the circumscribing circle "C". In a second operation, a more or less conventional micrometer was used to obtain the "D" dimension, which is a cross-section from a high point of one lobe to a low point opposite. It was not the practice, however, to calculate the difference between these two micrometer readings; i.e., the K, or out of round dimension.

That is, the dimensions C and D of the fastener alone, even if themselves within acceptable limits, do not guarantee an acceptable K or out of round dimension. Moreover, the two-step inspection process utilizing two micrometers is quite cumbersome to perform, is time-consuming, requiring individual handling and inspection of each part to be inspected and gaged in this method, and also effectively doubles the potential for measurement error. These techniques have not been applied to the measurement of point threads.

OBJECTS AND SUMMARY OF THE INVENTION

Accordingly, it is a general object of the invention to provide a novel and improved method and apparatus for gaging point threads or other special threads of a threaded fastener.

Briefly, and in accordance with the foregoing object, a method for gaging selected sections of threaded fasteners comprises providing gage means for measuring a plurality of cross-sectional dimensions of said selected sections; positioning a fastener with a selected section in surface-to-surface contact with said gage means; recording information corresponding to the dimensions of said selected sections as measured by said gage means during said positioning of said fastener with said selected sections in surface-to-surface contact therewith, to form recorded data, and ascertaining information representative of the geometry of said selected section from said recorded data. The invention also includes apparatus for carrying out this method.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a view of an apparatus in accordance with the invention, suitable for carrying out the method of the invention.

FIG. 2 is a diagrammatic cross-sectional view of a trilobular body indicating various dimensions and dimensional relationships thereof;

FIG. 3 is an enlarged, partial cross-sectional view of a roller-type gage instrument of the apparatus of FIG. 1, taken on the line 3—3 of FIG. 1;

FIG. 4 is an enlarged, partial cross-sectional view of a second roller-type gage instrument forming a part of the apparatus of FIG. 1, taken on the line 4—4 of FIG. 1;

FIGS. 5 and 6 are enlarged partial views, partially in cross-section of the respective roller gage apparatuses of FIG. 1;

FIG. 7 is an enlarged, partial cross-sectional view through a grooved roller apparatus of a form for engagement with a threaded fastener having a conventional thread form;

FIG. 8 is a cross-section similar to FIG. 7 showing a modified form of grooved roller formed for engagement with a threaded fastener having a modified thread form;

FIG. 9 is a cross-sectional view similar to FIGS. 7 and 8 but showing engagement of a threaded fastener by the smooth-faced roller of FIG. 4; and FIGS. 10 and 11 illustrate engagement of a trilobular fastener with an alternate form of gaging instrument illustrated in FIG. 1.

DETAILED DESCRIPTION OF THE ILLUSTRATED EMBODIMENT

Figure 12:
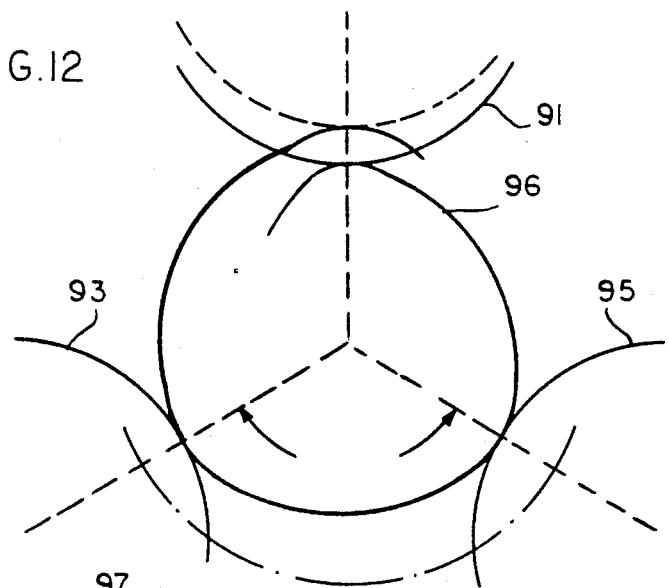
FIG. 12 is an enlarged partial end view showing, in somewhat exaggerated form, the spacing of three gage rollers approximately 120° apart and spanning one thread lead.

Referring now to the drawings and initially to FIG. 1, there is shown an apparatus in accordance with the invention which is also suitable for carrying out the method of the invention. The apparatus includes at least one gage apparatus or gage means such as a roller-type gage 20, which will be more fully described hereinbelow. In the illustrated embodiment, a second similar roller-type gage 22, also to be more fully discussed hereinbelow is also provided. Alternatively, a gage of the type indicated by reference numeral 24 in FIG. 1 might be utilized, although roller-type gages such as gages 20 and 22 are preferred. The alternate type gage 24 is of the type referred to as a V-anvil micrometer.

The method of the invention gages the out of round or so-called K dimension of a fastener which may be a threaded fastener or an unthreaded fastener blank, as the term "fastener" is to be understood, when used hereinafter. The fastener may be poly-arcuate or lobular in shape, or round. In the former case, the K dimension may also be referred to as the degree of lobulation. However, the ensuing description is facilitated by reference particularly to a trilobular body 30, which may be a fastener blank or a trilobular threaded fastener. A trilobular body 30 is indicated generally in FIG. 2. An unthreaded trilobular blank, which is designated by reference numeral 30a is shown in FIGS. 1 and 6, while a completed threaded trilobular fastener designated by reference numeral 30b is shown in FIGS. 1 and 5. The fastener 30b may also be provided with a tapered or conical lead-in surface or tip 35, such as in a thread-forming type of fastener.

The trilobular body 30 in the example shown in the drawings, is placed in surface-to-surface contact with one or both of the gages 20 and 22 shown in FIG. 1 for measuring the dimensions C, E which correspond respectively to diameters of circumscribing and inscribing circles 32, 34 of the trilobular body 30. The orientation of a body 30 (which may be blank 30a or threaded fastener 30b) with respect to the gage 20 is indicated in cross-section and somewhat diagrammatically in FIG. 3. In similar fashion, the engagement of a threaded fastener 30b with the gage 22 is shown in somewhat diagrammatic cross-sectional form in FIG. 4. A somewhat enlarged view of the gages 20 and 22 as illustrated in FIG. 1 are found in FIG. 5 (gage 22) and in FIG. 6 (gage 20). Typical gaging of the circumscribing and inscribing circles for a trilobular body 30 generally with the anvil-type micrometer 24 are shown in FIGS. 10 and 11, respectively. The ensuing discussion will refer, in additional detail to the gages as illustrated in these respective figures of drawing and to the gaging method of the invention for gaging both threaded and unthreaded fasteners, both of poly-arcuate and round form, as well as similar bodies, to determine out-of-roundness thereof.

Referring to FIG. 1, the apparatus and method of the invention proceed by recording data corresponding to the measurements made by the respective gages and ascertaining a predetermined relationship between the inscribed circle and circumscribed circle from this recorded data. The means for recording and processing the data is indicated at FIG. 1 as a data-processing unit 26. An additional CRT type display 28 may also be coupled with the data-processing unit 26 to display data associated with these measurements. We have selected as a data-processing unit 26 a DATAbank Plus System from Brown & Sharpe, Inc., North Kingstown, R.I. We have modified the Databank Plus software, as indicated in the microfiche appendix filed in my related U.S. patent application Ser. No. 07/550,701, filed Jul. 10, 1990, and incorporated herein by reference. Any CRT display may be used, we have selected a Wyse monitor.

Referring now to FIG. 2, we have discovered that useful statistical data for manufacturing control and batch processing can be obtained by determining the difference between the respective pitch cylinder diameters corresponding to the respective inscribed or inscribing circle 34 (E) and circumscribed or circumscribing circle 32 (C) of a poly-arcuate or lobular body. One-half of this difference constitutes the K or out of round dimension of the body. In this regard it will be seen that a trilobular body has been illustrated in diametral cross-section in FIG. 2. This trilobular body 30 has a geometry as is generally described in U.S. Pat. No. 3,195,156, to Phipard, for example. That is, the trilobular cross-sectional shape will be seen to have three lobes 40, 42, 44 that are separated by arcuate sides 50, 52, 54 such that the lobes generally define an arcuate equilateral triangle. The circumscribing circle 32 or diameter C will be seen to form tangents to the three lobes, while the inscribing circle 34 or diameter E forms a tangent to the arcuate sides.

As mentioned hereinabove, we have found that one-half of the difference between these diametral dimensions, sometimes designated as the K dimension, out of round, or degree of lobulation of the lobular shape, is a significant measurement in determining product acceptability.

Briefly, when using the anvil-type micrometer 24, and referring to FIGS. 10 and 11, the circumscribing circle is measured as shown in FIG. 10 by placing the lobes 40, 42 and 44 of the body 30 in contact with the respective three relevant surfaces of the micrometer. It will be seen in this regard that the micrometer has a generally V-shaped anvil portion 46 and a selectively advanceable and retractable, preferably flat-ended cylindrical spindle member 48. Similarly, as seen in FIG. 11, the inscribing circle diameter is obtained by placing the arcuate sides 50, 52 and 54 in surface-to-surface contact with the respective flat internal surfaces of the V-shaped anvil 46 and the spindle 48.

While the method and apparatus have been described thus far with reference to a trilobular body 30, it should be recognized that the apparatus and method herein described is also applicable to measuring unacceptable ovality of out-of-roundness of round-bodied fasteners whether threaded or unthreaded blanks, as well. Often this condition goes undetected using presently available gaging systems.

Referring now in more detail to FIGS. 3-9, the method and apparatus for obtaining these measurements with the roller-type gages 20, 22 is illustrated. Initially, it will be seen that each of the roller-type gages 20, 22 includes a plurality of rollers in a spaced circumferential array about a central axis. While any suitable commercially available gage components may be utilized, we have selected an Electronic Dial Indicator from Brown & Sharpe, Inc., North Kingstown, R.I., and a roller gage from Johnson Gage, Bloomfield, Conn. Alteration of the number and positioning of rollers, as may be required for polygonal or poly-arcuate shapes other than trilobular, is within the scope of the invention. In the illustrated embodiment, preferably three such rollers 60, 62, 64 and 70, 72, 74 are arrayed at 120° intervals about central axes 65, 75. It will be seen that, when a body 30, (be it threaded fastener 30a or blank 30b) is inserted into each gage, its axis is also coincident with the central gage axis 65, 75.

The rollers 60, 62 and 64 of gage 20 are arranged with smooth surfaces for contacting an outer surface of the body to be measured, which body may be an unthreaded member such as blank 30a or a threaded fastener such as fastener 30b, as well as being either lobular or round in form. These rollers can measure both the circumscribed circle 32 and the inscribed circle 34 of an outer surface of the body as the body to be measured is rotated therewithin. In the case of a threaded fastener such as fastener 30b, these measurements will yield a measure of the K, or out of round dimension of the outer diameter or thread crest diameters of the fastener.

In the case of a threaded fastener such as fastener 30b, an additional gage such as gage 22, which employs grooved rollers 70, 72 and 74, arranged for measuring the C and E dimensions corresponding to the circumscribing and inscribing circles 32, 34 at the pitch line or pitch diameter of the thread. This measurement by the use of grooved rollers is illustrated further in FIGS. 7 and 8. The measurement of the crest or outer diameter of the threads by rollers of the gage 20 is illustrated with respect to roller 62, for example, in FIG. 9. Accordingly, for a threaded fastener two separate out of round or K dimensions will be determined, one for the outer diameter of the thread and one for the pitch line diameter of the thread.

Accordingly, the rollers 60, 62 and 64 are generally right cylindrical members having smooth continuous surfaces. However, the rollers 70, 72 and 74 are circumferentially grooved. These grooves, indicated by reference numeral 80 in FIG. 7, and an alternative groove form indicated by reference numeral 80a in FIG. 8 are shaped to make contact with the threads of a threaded fastener in such a way as to effect the measurement of the C and E dimensions at the pitch line or pitch diameter of the fastener. Moreover, the respective grooves 80 and 80a are further shaped in complementary form to the pitch or shapes of the threads which they are intended to measure at the pitch line. For example, the grooves 80 of FIG. 7 are generally tapered in a complementary fashion for entering the threads of the fastener 30b shown therein.

On the other hand, exemplary fastener 130b of FIG. 8 has a somewhat different thread pitch profile and hence the grooves 80a are somewhat more rectangularly shaped at their inner aspects and convergent at their outer aspects to accommodate this thread-form of fastener 130b. The thread form of fastener 130b is generally that described in U.S. Pat. No. 4,820,098 to Taubert et al, wherein the flank angle of the thread is on the order of 60° and the flank angle of the thread crests extending beyond the nominal diameter of the screw is on the order of 30°. Accordingly, the form of the grooves 80a is varied somewhat to accommodate this sort of thread form. The form of the grooves 80, 80a may be further varied as appropriate for any desired thread form angle design without departing from the invention. That is, the grooved rollers 70, 72, 74 are shaped to contact the fastener in such a way as to measure the C and E dimensions at the pitch line. The actual form of the grooves may be said to be complementary with the thread pitch angle or thread form of the fastener to be so measured.

In accordance with the method and apparatus of the invention, suitable direct indicators or indicator means 90, 92 and 94 may also be provided on the respective gages 20, 22 and 24 for a direct read-out of the respective fastener dimensions as they are gaged.

The method and apparatus of the invention also contemplate measuring the shape or envelope of a tapered, lead in or thread-forming portion 35 (see FIG. 5) of a thread forming type of fastener. This is preferably accomplished using the roller-type gages 20, 22 as best viewed in FIGS. 4 and 5. In accordance with the method of the invention, the lead-in portion of the fastener is rotated several full 360° turns within the rollers, thus axially advancing the same somewhat relative to the rollers. The data developed in response to this rotation and advancement can be further utilized by the data-processing means 26 to develop data representative of the shape or envelope of the lead-in portion of such a fastener. In the gaging of the "full threads" of the body away from the lead-in portion of the fasteners, the method of the invention contemplates rotating the fastener 30 substantially 360° and obtaining statistical data therefrom for determining the "aggregate" out-of-round dimension of the fastener. Using the method and apparatus of the invention, the depth of the grooves 80 (see FIG. 7) would be dictated by product specifications, as mentioned above. However, this could be varied up to 0.325 P (pitch).

In gaging or measuring the point or lead-in portion of most types of threaded fastener, it is also desired to assure sharp or full crest formation and proper taper of the several threads leading from the body threads toward the point or lead-in portion. The requirement for sharp, crested point threads extends a few thread leads from the full body threads to a location on the point where the diameter of the circumscribing circle is less than the pitch diameter of the thread to be formed. This condition will enable sharp, crested point threads to enter the minimum pilot hole required for the formation of 100% depth of thread in the workpiece.

In this regard, the method and apparatus of the invention contemplate the measurement of point threads of the type which are used in thread forming screws as well as other special threads. Such other special threads may include a truncated lead-in portion provided in so-called anti-cross-threading fasteners which are intended for use in pretapped holes or nuts. Such special type threads also include the point or lead-in or so-called workpiece-entering section of a dual lobulated type of fastener such as is shown in U.S. Pat. No. No. 4,040,328, and also the intermediate or initial thread-forming section of a step-taper type of fastener as is shown in U.S. Pat. No. 4,194,430.

Accordingly, and referring also to FIGS. 12-15, such special threads or point threads have been illustrated in connection with a preferred form of the invention for gaging or measuring such lead-in or point threads, or other special threads. These point or other special threads and so-called body threads of such a fastener may also be distinguished by function. In general terms, the body threads generally function in holding the fastener, once the same is fully driven, relative to a workpiece. In contrast, such other point threads or other special threads generally perform functions other than holding functions and may be referred to therefore as being "non-holding" threads. These latter, non-holding threads may play a role in the initial formation of threads in an unthreaded pilot hole or nut, or act to prevent cross-threading in a pretapped hole or nut.

Figure 13:
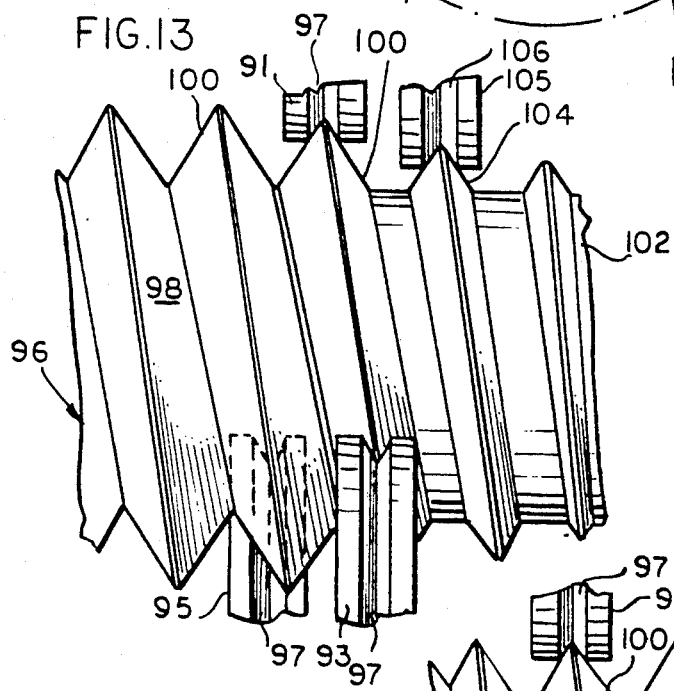
FIG. 13 is an enlarged partial elevation illustrating the use of an additional gage roll or roller for gaging or measuring additional lead-in, point or other special threads.

A similar gage to those described above, has three rolls or rollers spaced approximately 120° apart, and here designated by reference numerals 91, 93 and 95. An exemplary fastener 96, illustrated in FIGS. 12-15, has a body portion 98 which is provided with body or holding threads 100 and a tip or lead-in portion 102 which is provided with point or lead-in or other special threads 104. Since the lead-in portion is often conical or frusto-conical in shape, the use of the three rolls or rollers 91, 93 and 95 will span a minimum axial distance of about one lead, as illustrated in FIGS. 12, 13 and 15. Hence, even if these rolls or rollers are provided with only a single circumferential generally V-shaped groove 97, rather than the multiple grooves of the axially longer rollers shown in the embodiments of FIGS. 5 and 7, for example, some minimal spacing will still be required to accommodate the three rollers in contact with the thread.

Accordingly, while this "three-roller" system will detect underfill of the point threads as the part is rotated, there will be no indication of the exact location of the discrepancy within the one-thread lead span of the rolls or rollers. Moreover, the resultant gage reading from the three rolls will not reflect a precise diametral value, but rather an average of three values of one tapered thread lead.

Accordingly, the invention provides an additional or auxiliary gage roll or roller 105, which alone contacts the point or other special threads to be gaged. Roller 105 is also provided with a single circumferential V-shaped groove 106. The dimensions of the rolls or rollers 91, 93 and 95 and of their grooves 97 will be dictated by product specifications. However, these rollers will be about one lead in thickness, and the V-grooves up to about 0.325 p (pitch) in depth, with sufficient end play to allow easy engagement with the threads at three equi-spaced points approximately 120° apart. Similarly, the point thread or special thread gaging roll or roller 105 will also be approximately one lead in width or thickness with its V-groove 106 shaped to mate the thread crest and up to 0.325 p in depth. The location of the point or special thread gaging roller 105 is optional providing that its movement is radial with respect to the axial center of the fastener (centroid of a lobular bodied fastener). This single roll 105 will permit recording of the exact location and extent of any lack of sharpness of point threads as the fastener is rotated. The roller 105 is associated with a gage 110 of the same type as gages 90,92 described hereinabove.

It is anticipated that during measurement of point or other special threads, only the roller 105 will be engaged in active measurement. The three rollers 91, 93 and 95 will function primarily as a fixture for holding and rotating the fastener to accomplish gaging by the gage 110 and roller 105. However, it is also within the scope of the invention to simultaneously gage or measure both point or other special threads or so-called non-holding threads using gage 110 and roller 105, and also the body or holding threads utilizing the rollers 91, 93 and 95. Hence all of the special or non-holding and body or holding threads of a given fastener may be gaged in a single operation utilizing both the three-roller body thread gage and a single roller point or special thread gage, in accordance with the invention. Moreover, it is also within the scope of the invention to gage point or other special threads using gage 110 and roller 105 and some other form of holding fixture.

As also mentioned above, the use of the single element gage 110 utilizing roll or roller 105 is also useful on the measurement of other types of so-called special threads, which may be body threads in some special fasteners, as well as point threads. However, these special threads usually do not function as holding threads. For example, the method and apparatus of the invention may be utilized in the inspection of special lobular fasteners such as those described in U.S. Pat. No. 4,040,328, a so-called dual lobulation fastener. The method and apparatus of the invention is also useful in the inspection of special lobular fasteners such as a so-called step taper type of fastener described in U.S. Pat. No. 4,040,328. This type of fastener requires full but undersized body threads preceding the point taper.

Figure 14:
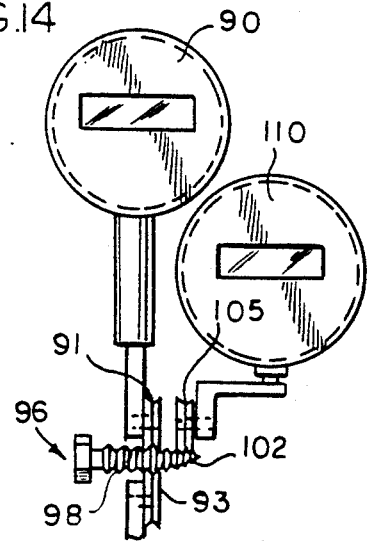
FIG. 14 is a partial elevation, similar to FIGS. 5 and 6, showing the added roller gage member and related apparatus of FIG. 13.
Figure 15:
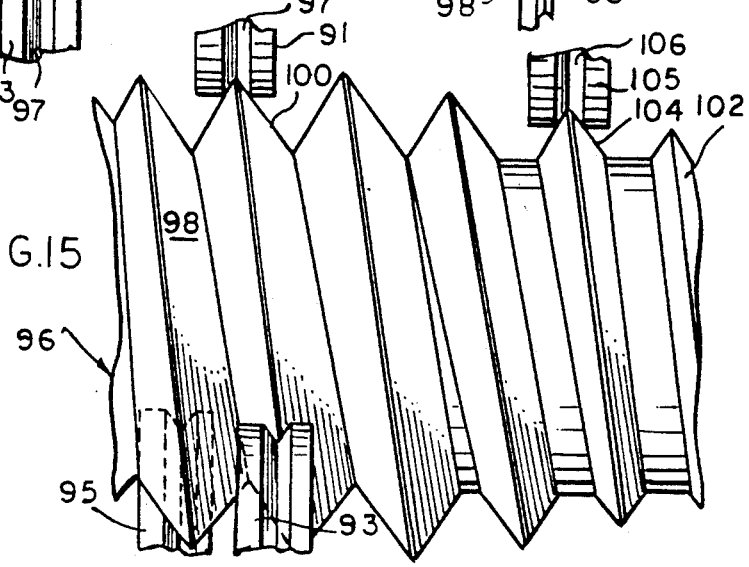
FIG. 15 is a partial enlarged elevation, similar to FIG. 13, showing an alternate arrangement of the additional gage roll or roller for measuring point threads or other special threads.

While FIGS. 12, 13 and 14 show the auxiliary or point thread engaging roller 105 in alignment with the roller 91, the location of the auxiliary roller 105 is optional. Roller 105 could conceivably be mounted in alignment with any movable roller, if desired, to confine the complete measuring system within approximately one lead of the fastener. FIG. 15 shows one example of an alternative location for roller 105.

In the case of the measurement of point threads of a lobular fastener, as the fastener is rotated, the gage readings will follow the generally undulating pattern of the lobular form with the measured values increasing along a slope generally the same as the slope of the point angle of the lead threads until the body threads of a uniform or constant width or cross-section are reached. Accordingly, a measure is obtained of radial penetration of the threads against rotation of the fastener and the gradual formation of complementary internal or mating threads in a workpiece. This path of radial penetration versus rotation can be plotted or recorded in appropriate fashion by the data-processing means 26 and for display upon the display means 28. The taper of the lead-in portion may also be measured against a desired specification for the product by use of the method and apparatus of the invention.

The invention further contemplates developing statistical data from measurements taken on a plurality of bodies or fasteners, which data may be utilized in lot control or processing control applications. The method also contemplates determining from the recorded data points of maximum deviation of each fastener as related to mean measured values thereof.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. Apparatus for gaging the geometry of a selected section of a threaded fastener comprising: gage means comprising a gage element having a surface of complementary form for surface-to-surface contact with a selected section of a fastener to be gaged in such a manner as to measure a plurality of cross-sectional dimensions of said section; holding means for holding said fastener in such a manner as to cause said gage element to engage and measure said selected section; recording means responsive to said gage means for recording the measurements obtained thereby to form recorded data, and data processing means for ascertaining information representative of the geometry of the selected section of a fastener from the recorded data.

2. The apparatus of claim 1 wherein said data processing means determines the degree of lobulation dimension of a lobular fastener.

3. Apparatus for gaging the geometry of both a holding section and a non-holding section of a threaded fastener comprising: gage means comprising at least three roller means in a spaced, circumferential array about a central axis, each of said roller means having an external surface shaped for engaging said fastener in such a way as to permit measuring a plurality of cross-sectional dimensions of said holding section; a gage element axially spaced from said plurality of roller means and having an external surface shaped for engaging said fastener in such a way as to permit measuring of a plurality of cross-sectional dimensions of said non-holding section; recording means responsive to relative movement of said gage element and of said roller means during rotation of a fastener in surface-to-surface contact with said gage element and with said roller means for recording corresponding recorded data, and data processing means for ascertaining information representative of the geometry of said holding section and of said non-holding section from said recorded data.

4. The apparatus of claim 3 wherein said external surface of each of said roller means and of said further gage element is circumferentially formed with at least one groove shaped for engagement with threads of the respective holding and non-holding sections of the fastener to be gaged.

5. The apparatus of claim 4 wherein said grooves have a radial depth of no greater than on the order of 0.325 P.

6. The apparatus of claim 3 wherein said data processing means further include means for processing said information which has been ascertained for a plurality of fasteners and developing statistical data therefrom.

7. The apparatus of claim 3 and further including observable indicator means for direct reading of measured dimensions of each fastener.

8. The apparatus of claim 3 wherein said data processing means determines the degree of lobulation of the holding and non-holding sections of the fastener.

9. A method for gaging the geometry of both body and point sections of a threaded fastener comprising: providing gage means comprising at least three rollers in a spaced circumferential array about a central axis, each of said rollers having an external surface shaped for engaging said body section in such a way as to permit measuring a plurality of cross-sectional dimensions of said body section; said gage means including a gage element axially spaced from said plurality of rollers and engaging said point section simultaneously with the engagement of said body section by said plurality of rollers for measuring predetermined cross-sectional dimensions of said point section; rotating a fastener to be gaged in surface-to-surface contact with said rollers and with said gage element; recording information corresponding to relative movement of said rollers and to movement of said gage element during said rotating to form recorded data, and ascertaining information representative of the geometry of said body section and of said point section from said recorded data.

10. The method of claim 9 and further including recording a plurality of said predetermined dimensions and the respective said information which has been ascertained for a plurality of threaded fasteners and developing therefrom statistical data.

11. The method of claim 9 wherein said ascertaining information comprises determining the degree of lobulation of body and point sections of a poly-arcuate fastener.

* * * * *